F. H. SCHLEY & C. F. KIMBALL.
PULSATOR FOR MILKING MACHINES.
APPLICATION FILED MAY 22, 1909.

1,182,215.

Patented May 9, 1916.
2 SHEETS—SHEET 1.

WITNESSES
Ethel G. Ingraham
Henry Peterson

INVENTORS
Frank H. Schley and
Clem. F. Kimball

F. H. SCHLEY & C. F. KIMBALL.
PULSATOR FOR MILKING MACHINES.
APPLICATION FILED MAY 22, 1909.
1,182,215.
Patented May 9, 1916.
2 SHEETS—SHEET 2.
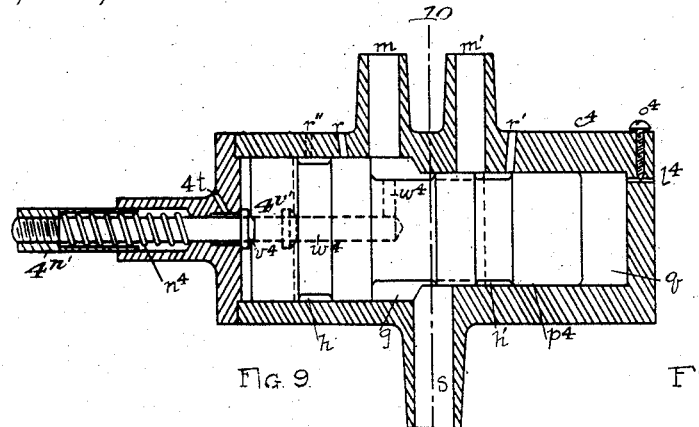 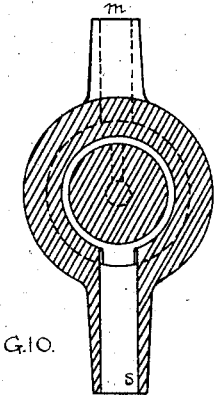
FIG. 9.  FIG. 10.
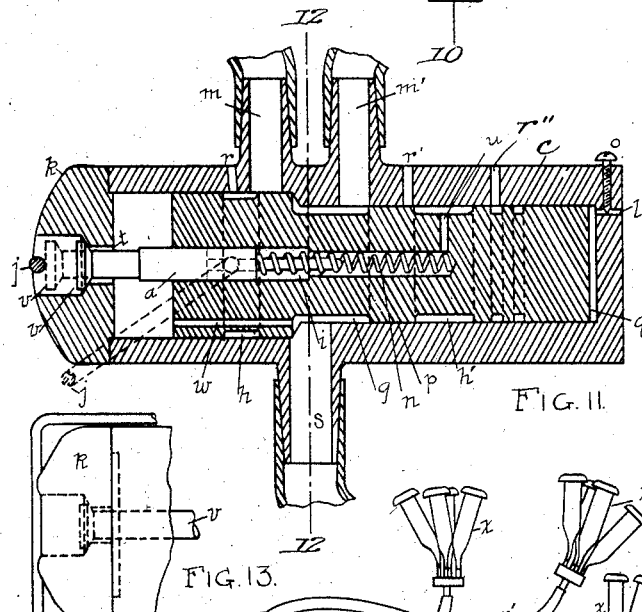 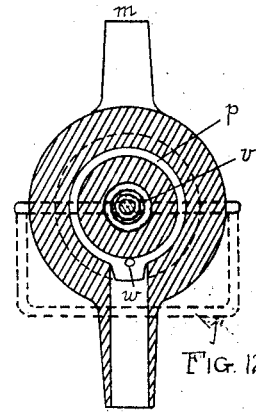
FIG. 11.  FIG. 12.
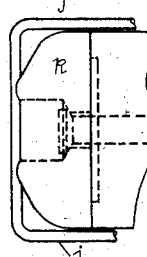
FIG. 13.
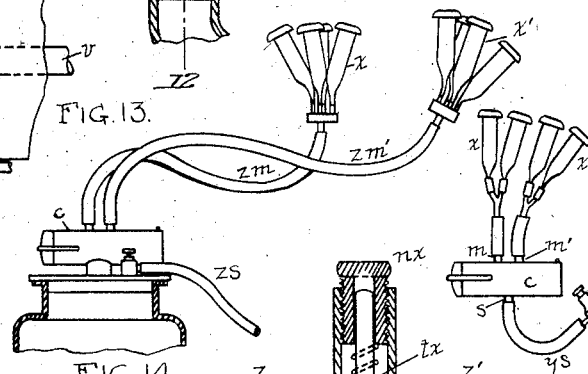
FIG. 14.  FIG. 16.  FIG. 15.
WITNESSES
Ethel G. Ingraham
Henry Peterson
INVENTORS
Frank H. Schley and
Clem. F. Kimball

UNITED STATES PATENT OFFICE.

FRANK H. SCHLEY AND CLEMENT F. KIMBALL, OF COUNCIL BLUFFS, IOWA.

PULSATOR FOR MILKING-MACHINES.

1,182,215. Specification of Letters Patent. Patented May 9, 1916.

Application filed May 22, 1909. Serial No. 497,818.

*To all whom it may concern:*

Be it known that we, FRANK H. SCHLEY and CLEMENT F. KIMBALL, citizens of the United States, residing at Council Bluffs, in the county of Pottawattamie and State of Iowa, have invented a new and useful Pulsator for Milking-Machines, of which the following is a specification.

Our invention relates to improvements in pulsators for use in connection with suction whereby the suction to be pulsated operates the apparatus for producing the pulsation without other connections, machinery or motor power. And the objects of our invention are; first, to provide simple and efficient means for pulsating an air suction; second, to provide such a means which may be used in connection with milking apparatus; third, to provide such an apparatus which may be easily taken apart and cleaned; fourth, to provide such an apparatus of the fewest possible parts making the same easy to separate, clean and replace; fifth, to provide a pulsator for milking apparatus such as can be applied between the receiving milk can and the teat cups or to the cover of the milk can, thus, giving more positive release of the suction in the teat cups; sixth, to provide such a pulsator which will alternately apply suction and release to one or two of the teats at a time so as to imitate as nearly as possible the pull of milking by hand; seventh, to provide a means in such a pulsator for changing and regulating the speed or rate of pulsations for one or more animals. We attain these objects by the apparatus illustrated in the accompanying drawings in which—

Figure 2:
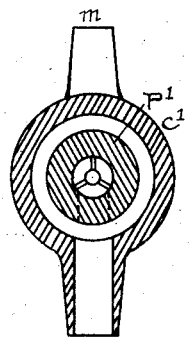
Figure 3:
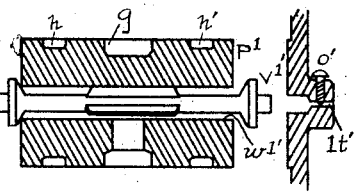
Figure 5:
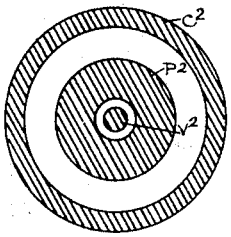
Figure 6:
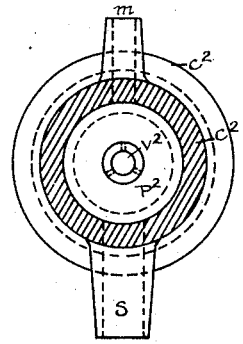

Figure 1, Fig. 4, Fig. 7, Fig. 9 and Fig. 11 are longitudinal sectional views of various forms of the pulsator: Fig. 2 is a transverse vertical cross section on the line 2—2 in Fig. 1; Fig. 3 is a longitudinal cross section of the plunger shown in Fig. 1 with a modified form of valve and showing also portions of the heads of the pulsator cylinder; Figs. 5 and 6 are transverse vertical cross sections on the lines 5—5 and 6—6 respectively of Fig. 4; Fig. 8 is a cross section showing a portion of a modified form of the structure illustrated in Fig. 7; Fig. 10 is a transverse vertical cross section on the line 10—10 in Fig. 9; Fig. 12 is a transverse vertical cross section on the line 12—12 in Fig. 11; Fig. 13 is a plan view of a portion of the structure disclosed in Fig. 11; Fig. 14 shows the pulsator applied to the cover of milk can; Fig. 15 shows the pulsator applied between the teat cups and milk can; and Fig. 16 is the cross section of the relief valve which may be used with our apparatus.

Similar letters refer to similar and like parts throughout the several views.

For a variety of purposes including the suction usually employed in milking machines, it is desirable to produce an intermittent action of such suction and to provide a partial or complete release of the suction at suitable intervals. To accomplish this, means independent of the suction itself have frequently been employed and more or less complicated apparatus has been provided. In our invention the power of the suction employed for other purposes is utilized to operate the pulsator. In all forms of the apparatus a cylinder is adapted to receive a piston or plunger and provided with a removable head at each end thereof except the forms of Figs. 9 and 11 in which only one head is removable. The piston or plunger is arranged to cut off the transmission of suction through the cylinder and while it is a valve for a pulsator, and may be of any suitable form, for convenience it will be referred to throughout the specification as the plunger. A detailed description will be applied to Figs. 11 and 12, the modifications in the other forms being separately distinguished. In said Figs. 11 and 12 the cylinder *c* is provided near the center of its length with a suction connection *s* for a suction supply pipe. The cylinder *c* also has one or more pipes as *m* and *m'* to which the pipes for suction desired to be pulsated are attached at points equidistant from the connection *s*, longitudinally of the cylinder, there being ports opening directly into the cylinder from each of the connections *s*, *m* and *m'*. It is not necessary that more than one such connection as *m* be used where only a single pulsated suction is desired but more may be applied and for better illustration the respective views, and also in Figs. 14 and 15, show the connections *m* and *m'* arranged to make the pulsations therein alternate in character. The suction in *s* is made to produce pulsated suctions in *m* and *m'* through the cylinder *c* by means of a suitable annular port or groove *g* in the plunger *p*. Suitable atmospheric release ports $r$ and $r'$ are provided through the wall of the cylinder which are arranged to communicate with the connections $m$ and $m'$ respectively at the ends of the stroke of the plunger by means of suitable annular ports or grooves $h$ $h'$ in the plunger $p$. The cylinder in this form of the invention has its bore divided into two parts, one of slightly greater diameter than the other, the two being separated by a shoulder located at the point of entrance of the suction supply port. The plunger $p$ has two portions of differing diameters to fit the two parts of the cylinder, the larger portion being of less length than the corresponding portion of the cylinder which portion is closed at its outer end by the head $k$. Said head is removably held in place by a bail $j$ hinged into the sides of the cylinder $c$, and adapted to be sprung into notches in the outer side of the head $k$, or to be swung to one side to release the head. The inner end of the larger portion of the plunger is always subject to the full suction from the supply port. The plunger $p$ is moved in the cylinder $c$ by varying the pressure in the space at the outer end of the larger portion of the plunger. Said space is always in communication with the groove $g$ through the restricted passage $w$ in the plunger, while in the head $k$ a larger atmospheric relief port $t$ is provided, under control of the outwardly opening valve $v$. Said valve is provided with a guide stem of less diameter, fitting in a bore $i$ in one end of the plunger $p$, and may be actuated outwardly by a spiral spring $n$ seated in a reduced extension of said bore and engaging a reduced extension on the guide stem, though as will be shown in describing the operation of the pulsator the spring may be omitted if desired. The outward movement of valve $v$ is limited by the bail $j$ when the device is in operative condition. A port $u$ is provided between the bore $i$ and the atmospheric relief port $h'$ in the outer surface of the plunger. The integral head closing the end of the smaller bore of the cylinder is provided with an atmospheric port $l$ which can be more or less restricted by the adjusting screw or valve $o$, by which means, as well as by regulating the suction supply, the frequency of the suction pulsations may be regulated. A port $r''$ may be provided in the cylinder $c$ between the smaller chamber $q$ and the annular groove or port $h'$ so that any leakage of suction through the bore $i$ of the plunger $p$, the port $u$ and annular groove or port $h'$ or around the plunger $p$ will not be communicated to the chamber $q$ and interfere with or lessen the resistance and affect the frequency of the pulsations thus regulated.

Figure 1:
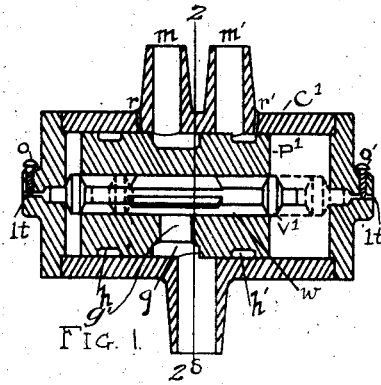

In Fig. 1 the plunger $p^1$ is of one diameter only and has an axial circular bore $w^1$ extending through it. The said bore receives the valve $v^1$ which is arranged to slide through the same and consists of two circular heads joined by a reduced stem provided with central radial guiding wings, said stem projecting beyond the heads at each end of the valve and the valve $v^1$ is constructed so that in any position of the plunger $p^1$ with reference to the valve $v^1$ one of the chambers of the cylinder $c^1$ at the ends of the plunger $p^1$ must be open and through the passage $w^1$ in which the valve $v^1$ operates and the radial port $g^1$ communication is established through the groove $g$ with the suction supply and when the valve is at either extreme of its travel the projecting ends of its stem will close one or the other of the inner enlarged portions of the restricted atmospheric ports $l^t$ or $l^{t'}$ which are provided in the respective heads of the cylinder and openings of which can be adjusted by the screws or valves $o$ and $o'$ for the purpose of regulating the flow of air therethrough and hence the rate of reciprocation of the valve.

In Fig. 3 the valve $v^{1'}$ is shown as constructed to seat on each end of the plunger $p^1$ but when seated at one end is open at the other.

Figure 4:
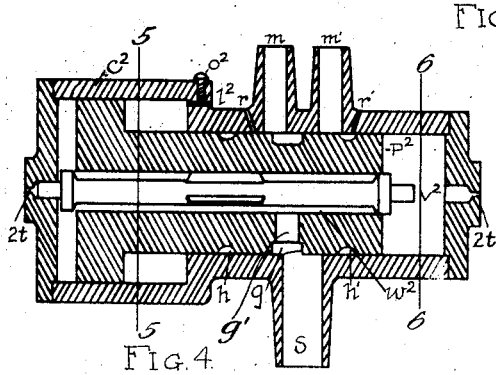
Figure 7:
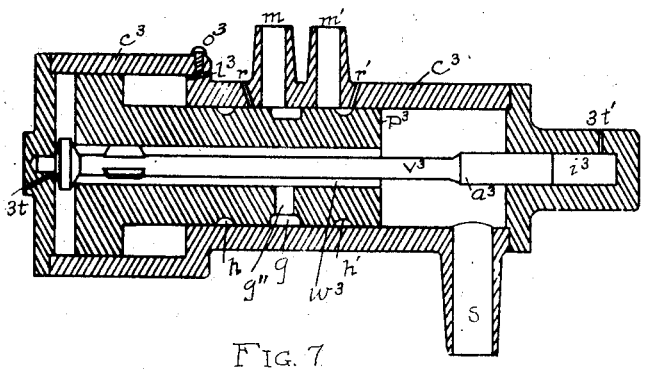
Figure 8:
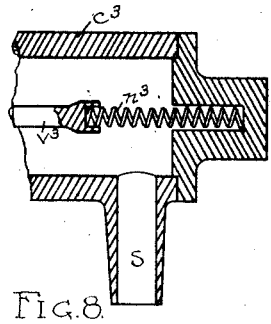

In Figs. 4, 7, and 9 the plungers $p^2$, $p^3$, and $p^4$ respectively are shown as having two concentric sizes, one larger than the other so that, as in Fig. 11, the movement of the plunger $p$ in the cylinder $c$ provides three chambers, the area of the plunger in each chamber being different from the area of the plunger $p$ in at least one of the other chambers.

In Figs. 4, 5, and 6 the construction is shown to be exactly similar to that in Fig. 1 except that the plunger $p^2$ is formed in two concentric diameters and the valve screws $o$ and $o^1$ are omitted from the air ports at the ends of the cylinder, and a single screw of the same kind is provided to regulate an atmospheric port which enters the annular space left by the movement of the plunger in the inner end of the enlarged portion of the cylinder.

In Fig. 7 the valve $v^3$ is shown having the part $u^3$ formed upon it which is arranged to move in a bore $i^3$ in a central elongated portion of the head at the smaller end of the cylinder $c^3$ a small transverse atmospheric port $3^{t'}$ being provided near the outer end of the bore $i^3$. At its other end the valve $v^3$ is formed the same as one end of the valve in Fig. 3. The head at the large end of the cylinder is provided with a short closed bore to form an air cushion for the projecting end of the valve stem, and a small atmospheric port leads into said bore near its inner end. This form is also provided with an intermediate air port $l^3$ and screw $o^3$ as in Fig. 4 to regulate the speed of movement of the plunger. In Fig. 8 the same construction is shown as in Fig. 7 except that the stem of the valve is made shorter and a spiral spring is seated in the end of the same and has its other end seated in the bore of the smaller cylinder head. Plunger $p^4$ is provided with a port $w^4$ extending from the center of its larger end to the groove $g$. Adapted to close this port is a valve $v^4$ having an enlarged head within the cylinder, and a stem slidable through a bore in an outwardly extending boss on the cylinder head. Upon the outer end of the valve stem is secured a hollow sleeve $4^{n\prime}$ guided in the enlarged outer end of the bore in the cylinder head, and a spring mounted on the stem presses the sleeve and valve outwardly. An enlargement of the inner end of the bore in the cylinder head forms a passage communicating with the atmosphere through a port $4^t$, said passage being closed by the valve head when in its normal outward position. The smaller end of the cylinder is provided with an atmospheric port $t^4$ and valve screw $o^4$ similar to those in Fig. 11.

The pulsator having the cylinder $c$ may form a part of the can cover as shown in Fig. 14 with the usual suction pipe $zs$ and having pulsating pipes $zm$ and $zm'$ leading to the teat cups $x$, $x'$ or as is preferable the cylinder $c$ of the pulsator may be connected to the milk can cover by the tube $ys$, the pulsator being brought nearer to the teat cups as shown in Fig. 15. Another connection $ys'$ may be used in the same manner so that one can may be used for more than one animal. A suitable relief valve $vx$ as shown in Fig. 16 may be employed. The relief valve is arranged to be connected with the pulsator and teat cups and the can at the connections $z$, $z'$. Such release valve may be used as shown in Fig. 15. The inwardly opening valve $vx$ is pressed to a seat by the spring $tx$, the tension of which may be regulated by the nut $nx$. Such relief valve may be placed between the teat cups and pulsator or anywhere in the system where it is desirable to reduce the vacuum or suction pressure, or change or regulate the same to suit the conditions or animal to be milked.

Referring to Fig. 1 the suction of the air at $s$ throws the valve $v^1$ to its extreme travel to one end of the cylinder $c^1$ closing the port $l^v$. The plunger $p^1$ is at this time more remote from the end of the cylinder $c^1$ to which the valve $v^1$ is thrown. The plunger $p^1$ will by reason of the lessened pressure created by the suction at the end of the cylinder to which the valve $v^1$ is thrown move to that end of the cylinder $c^1$ until the plunger $p^1$ passes over and covers one end of the valve $v^1$ opening the other end or partially opening the same by reason of the valve being longer than the plunger $p^1$. The suction then throws the valve $v^1$ to the opposite end of the cylinder opening the port $l^v$ and closing the port $l^{v\prime}$. This produces a greater pressure on the end of the plunger $p^1$ from whence the valve $v^1$ came than on its opposite end. The result is that the plunger $p^1$ in the same manner is forced to the opposite end of its travel in the cylinder $c^1$. The rate of travel of the plunger in either direction may be regulated by adjusting the corresponding screw $o$ or $o'$; in Fig. 3 the valve $v^{1\prime}$ is shown with the heads of the valve seating upon the bore $w^{1\prime}$.

The only difference in the operation of the valve $v^{1\prime}$ as shown in Fig. 3 and the operation of the valve $v^1$ in Fig. 1 is that the respective heads of the valve $v^{1\prime}$ seat on the boring $w^{1\prime}$; whereas, in Fig. 1 the valve $v^1$ passes into the boring $w^1$ and in both cases the operation of the valve results in reducing the suction and increasing the atmospheric pressure in one end of the cylinder.

In Fig. 1 the valve $v^1$ operates to change the atmospheric pressure in one end of the cylinder during the whole movement of the plunger $p^1$, while in Fig. 3 the valve $v^{1\prime}$ permits a leakage of air into the cylinder if the valve $v^{1\prime}$ is carried away from either head of the cylinder and during the remainder of the movement of the plunger.

In Fig. 4 closing or opening of the port 12 by the screw $o^2$ or by any suitable means will regulate the compression and suction of the air in the intermediate annular chamber to properly retard the movement of the plunger $p^2$.

For convenience of expression the suction in the connections $m$ and $m'$ are called pulsated suctions and in the connection $s$ the suction $s$. In all forms as in Fig. 11 when the plunger $p$ moves in one direction the suction $s$ is communicated through the groove $g$ to the pulsated suction $m$, the other pulsated suction $m'$ being closed. As the pulsated suction $m$ is opened the release port $r'$ is made to communicate with the connection $m'$ releasing all suction through $m'$. And in the same manner when the suction is communicated to the connection $m'$, the pulsated suction $m$ is released by means of the communication of the port $r$ with the connection $m$. In this manner alternate suctions may be produced by the movement of a single pulsating valve as the plunger $p$. It is obvious that only one of the pulsated suctions $m$ may be used but preferably we place the pulsator near the teat cups and use the alternate pulsating suctions upon each of the two sets of teats. This alternate movement of the plunger $p^3$ to effect the results stated may be also accomplished by using a single ended valve $v^3$ of form as shown in Fig. 7.

When the plunger $p^3$ is in the position shown in Fig. 7 the valve $v^3$ closes the opening of the port $w^3$ through the plunger $p^3$ into the chamber of the enlarged portion of cylinder $c^3$ and the air through the port $3^t$ holds the valve $v^3$ to its seat at the end of the port $w^3$ in the plunger $p^3$. The suction on $s$ then draws the plunger $p^3$ to the opposite end of the cylinder $o^3$ or until the portion $a^3$ of the valve $v^3$ cuts off the port $3^{t'}$. The portion $a^3$ will by the compression of the air in the chamber $i^3$ or by striking the bottom of the same, cause the valve $v^3$ to leave the port $w^3$ in the plunger $p^3$ when the plunger $p^3$ has reached the limit of its travel farthest from the port $3^t$. As soon as the valve $v^3$ becomes unseated from the port $w^3$ through the plunger $p^3$ the pressure of the air through the port $3^{t'}$ and the suction in the cylinder $c^3$ will throw the valve $v^3$ to its extreme travel toward the port $3^t$ closing the latter. By reason of the larger area of one end of the plunger $p^3$ than the other, the suction will throw the plunger $p^3$ back to the position shown in Fig. 7 when the operation will be constantly repeated. Any desired speed may be attained by limiting the suction and compression through the port $l^3$ by any suitable means as the screw $o^3$.

If a spring $n^3$ is employed, as shown in Fig. 8, in place of the plunger portion $a^3$ of the valve $v^3$ and the chamber $i^3$, the valve $v^3$ is moved with the plunger $p^3$ until the tension of the spring $n^3$ exceeds the suction of the valve $v^3$ on its seat in the port $w^3$ through the plunger $p^3$ when it will fly back to the position shown in Fig. 7 closing the port $3^t$. The plunger $p^3$ will then follow the valve $v^3$ back toward that end of the cylinder $c^3$ until the port $w^3$ through the plunger $p^3$ is again closed by the valve $v^3$.

In a similar manner, as shown in Fig. 9, the valve $v^4$ may be arranged to close the port $w^4$ and a spring $n^4$ arranged without the cylinder $c^4$ to close the port $4^t$. When the plunger $p^4$ is in the position shown in Fig. 9 the valve $v^4$ will close the port $w^4$ and the plunger $p^4$ will then by reason of the decreased suction on the larger end of the plunger $p^4$ while the intermediate shoulder between the larger and smaller portions of the plunger which here forms one side of the groove $g$ is under full suction be moved toward the opposite end of the cylinder $c^4$ drawing with it the valve $v^4$ against the spring $n^4$ and allowing free access of air through the port $4^t$. The spring $n^4$ will then be compressed until it overcomes the suction through the port $w^4$ on the valve $v^4$, or until the nut $4^{n'}$ is stopped in the limit of its travel, say when the valve $v^4$ is in position shown at $4^{v'}$. Then the valve $v^4$ will be released from the port $w^4$ and be returned to the other end of its travel closing the port $4^t$. By reason of the suction through the port $w^4$ and the unequal area of one portion of the plunger $p^4$ over the other, the plunger $p^4$ will be returned to close the valve $v^4$ in the port $w^4$. Similarly as described in all forms and illustrated in Fig. 11, the suction is, by the movement of the plunger $p$, pulsated through the suctions $m$ and $m'$ and the plunger $p$ is suitably retarded by compression of air in the chamber $q$ under control of the screw $o^4$ and port $l^4$.

In Fig. 11 the valve $v$ acts to vary the pressure of suction on the differing areas of the plunger $p$ by changing the influx of air from without. When the plunger $p$ is at the end of its travel most remote from the port $t$ and just as it closes the release port $r'$, the pressure of air from without the cylinder $c$ through the port $u$ and the bore or chamber $i$ upon the valve $v$ is reduced and the suction through the port $w$ causes a reduction of the pressure at the larger end of the cylinder and operates to move the valve $v$ in to close the port $t$. The plunger $p$ by reason of the suction in the chamber having the larger piston area will then move toward the port $t$. The pressure of the air upon the plunger portion $a$ of the valve $v$ through the port $r'$, port $u$ and the chamber $i$ will then tend to move the valve $v$ outward to open the port $t$ but by reason of the area of the valve $v$ over the port $t$ being greater than the portion of the valve $v$ at $a$, the valve $v$ will cover the port $t$ until the plunger $p$ in the bore or chamber $i$ strikes the plunger portion $a$ of the valve $v$, the bore or chamber $i$ being extended beyond the end of the portion $a$ of the valve $v$ sufficiently less than the travel of the plunger $p$ so that it will press the valve $v$ off its seat on the port $t$, whereupon the valve $v$ is released from its seat covering the port $t$.

When the valve $v$ is released from its seat covering the port $t$ it will only partially relieve the suction through the port $w$ in the chamber between the plunger $p$ and the head of the cylinder $k$. The valve $v$ will tend to be seated by a force equal to the difference of the atmospheric pressure and the pressure in the chamber, exerted upon the area of the cross section of the valve $v$ where it passes through the port $t$. The tendency of the valve $v$ to be thrown to the position $v'$ off from its seat will be equal to the force exerted by the difference of the atmospheric pressure through the ports $r'$, $u$ and the chamber $i$ and the pressure in the chamber at the left of the plunger upon the area of the cross section of the portion $a$ of the valve $v$. Since the area of the portion $a$ of the valve $v$ is greater than the area of the cross section of the valve $v$ where it passes through the port $t$ the force tending to move the valve off from its seat and to the position $v'$ is greater than the tendency to seat the valve and the valve $v$ will, therefore, be moved to the position $v'$ after it has left its seat a sufficient distance; this distance is regulated so that the opening between the valve and the seat is greater than the space about the valve $v$ through the port $t$. The valve $v$ is so proportioned where it passes through the port $t$ that this result is obtained, the portion $a$ being made of the same size as the port $t$.

When the port $t$ is opened the port $w$ is arranged of insufficient size to equalize the pressure on both areas of the plunger $p$, at its enlarged part and the pressure nearest to the port $t$ will be reduced and the plunger $p$ will move to the opposite end of its travel, when the operation just described will be repeated. It will be observed that the spring $n$, Figs. 11 and 12 is not at all necessary to the operation of this device as just described but it frequently happens in this class of apparatus that dirt and grit interferes with the movement of valves like the valve $v$ and a more positive means than suction is desired to overcome the dangers of inaction caused thereby. For this purpose the spring $n$ may be employed in the plunger $p$ to act upon the valve $v$ either in connection with the port $u$ or entirely without it. When the plunger $p$ moves to the limit of its travel toward the port $t$ the spring $n$ is compressed if the valve covers the port $t$ until the compression of the spring overcomes the pressure of the air upon the valve $v$ when the valve $v$ is moved by the expansion of the spring $n$ to open the port $t$ as to the positions $v'$. Or if the bail $j$ is not used the portion $a$ of the valve $v$ enters the port $t$ and the suction upon the portion $a$ through the port $w$ prevents the valve $v$ from being thrown by the spring $n$ beyond the position $v'$. When the valve $v$ reaches the position $v'$ as heretofore described, the plunger $p$ will travel toward the opposite end of the cylinder $c$ from the port $t$. Then the spring $n$ will be relaxed by the movement of the plunger $p$ until the suction through the port $w$ draws the valve $v$ to cover the port $t$; the plunger $p$ will then be moved as before toward the port $t$, compressing the spring $n$, when the operation described will be repeated.

To clean the apparatus illustrated in Fig. 11 the bail $j$ is sprung out of the slot in the cover $k$ of the cylinder $c$ to the position $j'$. The valve $v$ is dropped out and the head $k$ may be removed and the plunger $p$ dropped out of the cylinder $c$ and the parts thoroughly cleaned. The plunger $p$ may be quickly and easily placed in the cylinder, the head $k$ placed in position with the valve $v$ through it and the bail $j$ brought in the position of $j'$ and the pulsator is ready for use.

What we claim is:—

1. In a suction pulsator a cylinder, a pulsator plunger therein and an axially disposed reciprocating valve adapted to admit air to one or more chambers of said cylinder to alternately decrease the intensity of the suction on said plunger to operate it.

2. In a suction pulsator a cylinder having a suction supply connection and pulsated suction connections and release ports, a plunger with grooves therein and adapted to alternately connect and disconnect said pulsated suction connections with said supply connections and said pulsated suction connections with said release ports, and an axially disposed reciprocating valve adapted to admit air to one or more chambers of the said cylinder to alternately decrease the intensity of the suction on said plunger to operate it.

3. The combination of a cylinder having heads with a port in one or both of said heads, a pulsator plunger in said cylinder and a valve adapted to vary the supply of air into the said cylinder through said port in one or more of said cylinder heads, said valve operated by the combined action of the plunger and suction upon said valve.

4. In a suction pulsator, a cylinder having concentric unequal bores, a supply suction connection, pulsated suction connections and release ports, a plunger having grooves and adapted to alternately connect and disconnect said supply suction connection with said pulsated suction connections and said release ports with said pulsated suction connections, an axially placed reciprocating valve adapted to open and close a port in one head of said cylinder to alternately decrease the intensity of the suction upon said plunger, said valve being operated by the combined action of said plunger and suction upon said valve and a spring adapted to accentuate the movement of said valve relative to the movement of the said plunger to operate the said valve.

5. In a suction pulsator a cylinder having concentric unequal bores, a pulsator plunger therein and an axially disposed reciprocating valve adapted to admit air to one or more chambers of said cylinder to alternately decrease the intensity of the suction on said plunger to operate it, and a means of pneumatically retarding the movement of said plunger.

6. In a suction pulsator a cylinder having concentric unequal bores, a pulsator plunger therein and an axially disposed reciprocating valve adapted to admit air to one chamber of the said cylinder to alternately decrease the intensity of the suction on said plunger to operate it and a means of pneumatically retarding the movement of the plunger.

7. The combination of a cylinder, a pulsator plunger therein, a removable cylinder head having a port therein and a valve adapted to open and close said port, and a bail for engaging said head to hold it to the cylinder.

8. The combination of a cylinder, a pulsator plunger therein, a removable cylinder head having a port therein, a valve passing through said port in said cylinder head and adapted to open and close said port, said valve operated by the combined action of said plunger and suction upon said valve and a bail for engaging said head to hold it to the cylinder and limiting the travel of said valve in one direction.

9. The combination of a cylinder having a supply suction connection, pulsated suction connections, and release ports, a pulsator plunger therein, a valve chamber in said plunger, a removable cylinder head having a port therein, a valve passing through said port and adapted to close it and extending into said valve chamber in said plunger, said plunger being provided with ports adapted to connect said valve chamber in said plunger with a release port in said cylinder and a bail for engaging said removable head to hold it to the cylinder and limiting the travel of said valve in one direction.

10. The combination of a cylinder having a supply suction connection, pulsated suction connections and release ports, a pulsator plunger therein, having ports adapted to alternately connect and disconnect said supply suction with said pulsated suction connections and said pulsator suction connections with said release ports and said plunger having a valve chamber therein and ports adapted to connect said valve chamber with said release port and a restricted port connecting one chamber of said cylinder with another, a removable cylinder head having a port therein, a valve passing through said port and adapted to close it and extending into said valve chamber in said plunger and a bail for engaging said removable head to hold it to the cylinder and limiting the travel of said valve in one direction.

11. The combination of a cylinder having a supply suction connection, pulsated suction connections and release ports, a pulsator plunger therein having ports adapted to alternately connect and disconnect said supply suction with said pulsated suction connections and said pulsator suction connection with said release ports and said plunger having a valve chamber therein and ports adapted to connect said valve chamber with said release port and a restricted port connecting one chamber of said cylinder with another, a removable cylinder head having a port therein, a valve passing through said port and adapted to close it and extending into said valve chamber in said plunger, a spring interposed in said valve chamber between said plunger and said valve and a bail for engaging said removable head to hold it to the cylinder and limiting the travel of said valve in one direction.

12. The combination of a cylinder having a supply suction connection, pulsated suction connections and release ports, a pulsator plunger therein having ports adapted to alternately connect and disconnect said supply suction with said pulsated suction connections and said pulsator suction connections with said release ports and said plunger having a valve chamber therein and ports adapted to connect said valve chamber with said release port and a restricted port connecting one chamber of said cylinder with another, a removable cylinder head having a port therein, a valve passing through said port and adapted to close it and extending into said valve chamber in said plunger, a spring interposed in said valve chamber between the said plunger and said valve and a bail for engaging said removable head to hold it to the cylinder and limiting the travel of said valve in one direction and a means for pneumatically retarding the frequency of the movement of said pulsator plunger in said cylinder.

13. The combination of; a cylinder having a suction supply and pulsator suction connections and heads with a port in one or both of same, a pulsator plunger therein, an axially placed reciprocating valve adapted to open and close one or both of said ports to alternately decrease the intensity of the suction upon said pulsator plunger to operate it; said valve being operated by successively changing the application of suction by the movement of said plunger, teat cups connecting with said pulsated suction connections and a receiving milk can interposed in said suction supply.

14. The combination of; a cylinder having a suction supply connection and pulsated suction connections, a pulsator plunger therein, a valve adapted to alternately vary the intensity of the suction upon said pulsator plunger to operate it; said valve being operated by succesively changing the application of the suction by the movement of said plunger, teat cups on one or more of said pulsated suction connections, a receiving milk can interposed in said suction supply and a relief valve interposed in said suction supply between the said receiving milk can and said cylinder.

FRANK H. SCHLEY.
CLEM. F. KIMBALL.

Witnesses:
P. O. ALLESHOUSE,
HENRY PETERSON.